(12) United States Patent
Walker et al.

(10) Patent No.: US 8,356,923 B2
(45) Date of Patent: Jan. 22, 2013

(54) SAFE LIGHTING SYSTEM

(75) Inventors: Donald Walker, St Andrews (GB); Malcolm Harry Dunn, St Andrews (GB); Cameron Francis Rae, St Andrews (GB)

(73) Assignee: The University Court of the University of St Andrews, St Andrews (GB)

( * ) Notice: Subject to any disclaimer, the term of this patent is extended or adjusted under 35 U.S.C. 154(b) by 332 days.

(21) Appl. No.: 12/919,184

(22) PCT Filed: Feb. 24, 2009

(86) PCT No.: PCT/GB2009/000494
§ 371 (c)(1),
(2), (4) Date: Aug. 24, 2010

(87) PCT Pub. No.: WO2009/106802
PCT Pub. Date: Sep. 3, 2009

(65) Prior Publication Data
US 2010/0320914 A1 Dec. 23, 2010

(30) Foreign Application Priority Data
Feb. 28, 2008 (GB) .................................. 0803662.6

(51) Int. Cl.
*G02B 6/04* (2006.01)
(52) U.S. Cl. ...................................... 362/555; 362/554
(58) Field of Classification Search .................. 362/554, 362/555, 556, 558, 580
See application file for complete search history.

(56) References Cited

U.S. PATENT DOCUMENTS

| | | | |
|---|---|---|---|
| 5,154,707 A | 10/1992 | Rink et al. | |
| 5,345,531 A | 9/1994 | Keplinger et al. | |
| 5,463,710 A | 10/1995 | Filgas et al. | |
| 6,441,364 B1 * | 8/2002 | Regev et al. | 250/221 |

FOREIGN PATENT DOCUMENTS

| | | |
|---|---|---|
| EP | 0989355 A1 | 3/2000 |
| WO | WO98/45645 | 10/1998 |
| WO | WO2008/129836 | 10/2008 |

OTHER PUBLICATIONS

Chung-Sheng Li et al: Automatic Fault Detection, Isolation, and Recovery in Transparent All-Optical Networks; Journal of Lightwave Technology, vol. 15, No. 10; Oct. 1997; pp. 1784-1793.
UK IPO Search Report for GB0803662.6 dated Jun. 9, 2008.
International Search Report for PCT/GB2009/000494 dated Jul. 24, 2009.

* cited by examiner

*Primary Examiner* — David V Bruce
(74) *Attorney, Agent, or Firm* — Moore & Van Allen PLLC; W. Kevin Ransom

(57) ABSTRACT

A lighting system comprising a light source, a fiber rope into which light emitted from the light source is coupled, and a control unit for controlling the optical power of light emitted by the light source to maintain the fiber rope at or below a predetermined upper temperature even if the fiber is partially or fully severed.

34 Claims, 2 Drawing Sheets

SAFE LIGHTING SYSTEM

FIELD OF THE INVENTION

The present invention relates to a lighting system, and more particularly to a lighting system that can provide a continuous path of light that is safe, even in explosive or hazardous environments.

BACKGROUND OF THE INVENTION

Conventional lighting systems employing, for example, LEDs, tungsten bulbs, or halogen strip lights, require electrical current to be carried in close proximity to where illumination is to be provided. In addition, some conventional lighting elements, for example tungsten bulb filaments, reach extremely high temperatures during operation. For everyday applications the presence of electrical current and high temperatures does not present a significant problem. However, this could be highly dangerous when used in hazardous and potentially explosive environments, for example during a gas leak at an offshore platform, a petrochemical plant, a mine, an oil taker or a distillery.

For some hazardous environments, a series of LED point lights can be installed to provide an escape guide path for use in an emergency. However, each LED light section has to be individually installed and each electrical connection must be regularly inspected and maintained to ensure the safety of the system, which leads to high costs. In addition, for some extremely hazardous environments, it is not possible to install any form of conventional emergency lighting because the supply of even tiny amounts of electrical current would be too dangerous.

WO 98/45645 discloses a method and apparatus for providing illumination based on a laser light source and a side emitting fiber optic cable. The laser light source emits a beam of light that is coupled into the side emitting fiber optic cable. The beam of light then propagates along the fiber optic cable and light is gradually emitted through the sides of the fiber optic cable. The application details how the apparatus could be used in an emergency lighting application as it can provide a continuous path of light that contains no electrical power. However, if the fiber optic cable is fractured or severed during operation, and particulates such as coal dust gather on the fractured or severed portion and absorb light energy, then the result can be a rapid and dangerous rise in temperature. In the presence of a low temperature ignition gas, such as diethyl ether, the result of such a temperature rise can literally be explosive. The solution described in WO 98/45645 is for the system to shut down or shutter the light source if the cable is cut or damaged. However, emergency lighting systems are the last resort for aiding escape from a building/facility in an emergency. Therefore, the fact that this system may shut down in an emergency situation renders it useless.

SUMMARY OF THE INVENTION

According to a first aspect of the present invention, there is provided a lighting system comprising a light source, a fiber light rope into which light emitted from the light source is coupled, and a control unit for controlling the optical power of light emitted by the light source to maintain the fiber light rope at or below a predetermined upper temperature even if the fiber light rope is partially or fully severed.

By controlling the optical power of the light coupled into the fiber rope, the system provides a path of light that contains no electrical power and is maintainable at or under a predetermined temperature suitable for safe use even in explosive and hazardous environments, where particulates, such as coal dust, could collect on the severed portions and absorb optical power of the light source.

Examples of the light source are a laser, a laser diode and an LED. Preferably, as the human eye has greatest response to light of near-green frequencies, the light source may be selected to emit green light.

Preferably, the fiber light rope comprises a plurality of side emitting fiber optic cables bundled together, typically twisted together, and encased in a transparent plastic sheath.

The light coupled into the fiber may be shaped so that it substantially fills the fiber rope. Preferably, the light coupled into the fiber has a substantially uniform power distribution. This is advantageous because it prevents hot spots forming at any point across the cross section of the rope.

Coupling optics may be provided to couple the light into the fiber light rope. The coupling optics may perform the dual function of coupling the light into the fiber and shaping the light so that it substantially fills the fiber rope and has a substantially uniform power distribution. In this case, the coupling optics may include beam transformer or shaping optics to suitably shape the light into a beam having a predetermined profile to promote spreading of the beam in the fiber light rope, so as to prevent the beam from concentrating on a small area of the fiber light rope and producing areas of higher temperature. The beam profile may be a top hat profile. Preferably, the coupling optics are telescope optics.

An index-matching unit, such as an index matching gel cell, may be included between the coupling optics and the fiber light rope to aid coupling of the light into the fiber light rope.

The control unit may supply drive current to the light source to allow the light source to emit light at or below a predetermined upper optical power. The upper optical power must be determined such that the temperature of the fiber light rope is maintained at or below a predetermined upper temperature. The control unit may be software based.

The upper temperature may be determined according to safety standards or may be determined based on the environment in which the lighting system is to be installed. The upper temperature may be, for example, 135 degrees centigrade in the case where the lighting system is to be used in the presence of a low auto ignition temperature (AIT) gas such as diethyl ether.

As the optical power-drive current relationship may vary for individual light sources, the optical power-drive current relationship is preferably determined for each light source prior to installation to determine an upper drive current corresponding to the upper optical power. This information may be made known to and used by the control unit to output an appropriate drive current to the light source so that an optical power which is the same or less than the upper optical power can be emitted. Thus, the optical power of the light source can be set by the control unit based on the individual optical power-drive current relationship so that the temperature of the fiber light rope can be maintained at or below a predetermined safe value. The light source can be replaced and the control unit can conveniently continue control of the new light source based on new information relating to the optical power-drive current relationship provided thereto.

As the temperature of the rope must be maintained at or below the upper temperature, which is directly related to the optical power of the light source and in turn to the drive current supplied to the light source, then the drive current should be maintained at or below a predetermined upper drive current. To this end, the lighting system preferably includes a current protection unit between the control unit and the light source for limiting the drive current supplied to light source to limit the optical power of the light emitted by the light source. The current protection unit is preferably embodied in hardware to safeguard against surges in the drive current supplied to the light source and to ensure the optical power emitted from the light source and the temperature of the fiber light rope are maintained at or below predetermined safe values.

The current protection unit may include one or more zener diodes. In a specific example, the current protection unit includes a zener barrier. Typically, this has three zener diodes, a resistor and a fuse. The value of zener barrier used may be selected based on the optical power-drive current relationship mentioned above.

The lighting system may further include a backup battery unit. The lighting system may selectively draw electrical power from an external power source, the mains, or from the backup battery unit. The lighting system may be simultaneously connected to more than one power source, and may selectively draw power from any of the power sources to which it is connected. Preferably, the lighting system may be connected to the backup battery unit and at least one other external power source. The control unit may control selection of the power source to be employed.

To allow the current protection module to survive a surge of power from the power source, which for example could result in full mains voltage being applied, an additional protection circuit is required. Additionally, a transient protection circuit module may be included between the control unit and the power source thereof to ensure against power surges from the power source. The transient protection circuit module is preferably embodied in hardware and may, for example, consist of a fuse and resistor combination.

A single light source may be coupled into one end of the fiber light rope, or alternatively each end of the fiber light rope may have a light source coupled thereto. In this case, both sources would be associated with their own dedicated control units and power supplies.

The fiber rope may comprise a single solid fiber or a multicore fiber or a bundle of single fibers. The fiber rope may comprise a plurality of side emitting fiber optic cables. An external transparent jacket may surround the fiber rope. The each fiber may be made from one of the following materials: acrylic, PMMA, silica.

A beamsplitter may be positioned in the optical path of light emitted by the optical source to split the light into two or more beams. The two or more beams may be coupled into two or more fiber light ropes. Alternatively, the two or more beams may be coupled into opposite ends of a single fiber light rope to form a closed loop.

All elements of the lighting system may be installed inside an explosion and flameproof box, excluding the fiber light rope. The backup battery unit may be housed inside the same explosion and flameproof box or a separate one if desired.

BRIEF DESCRIPTION OF THE DRAWINGS

Various aspects of the invention will now be described by way of example only and with reference to the embodiments shown in the accompanying drawings in which.

SPECIFIC DESCRIPTION OF THE DRAWINGS

Figure 1:
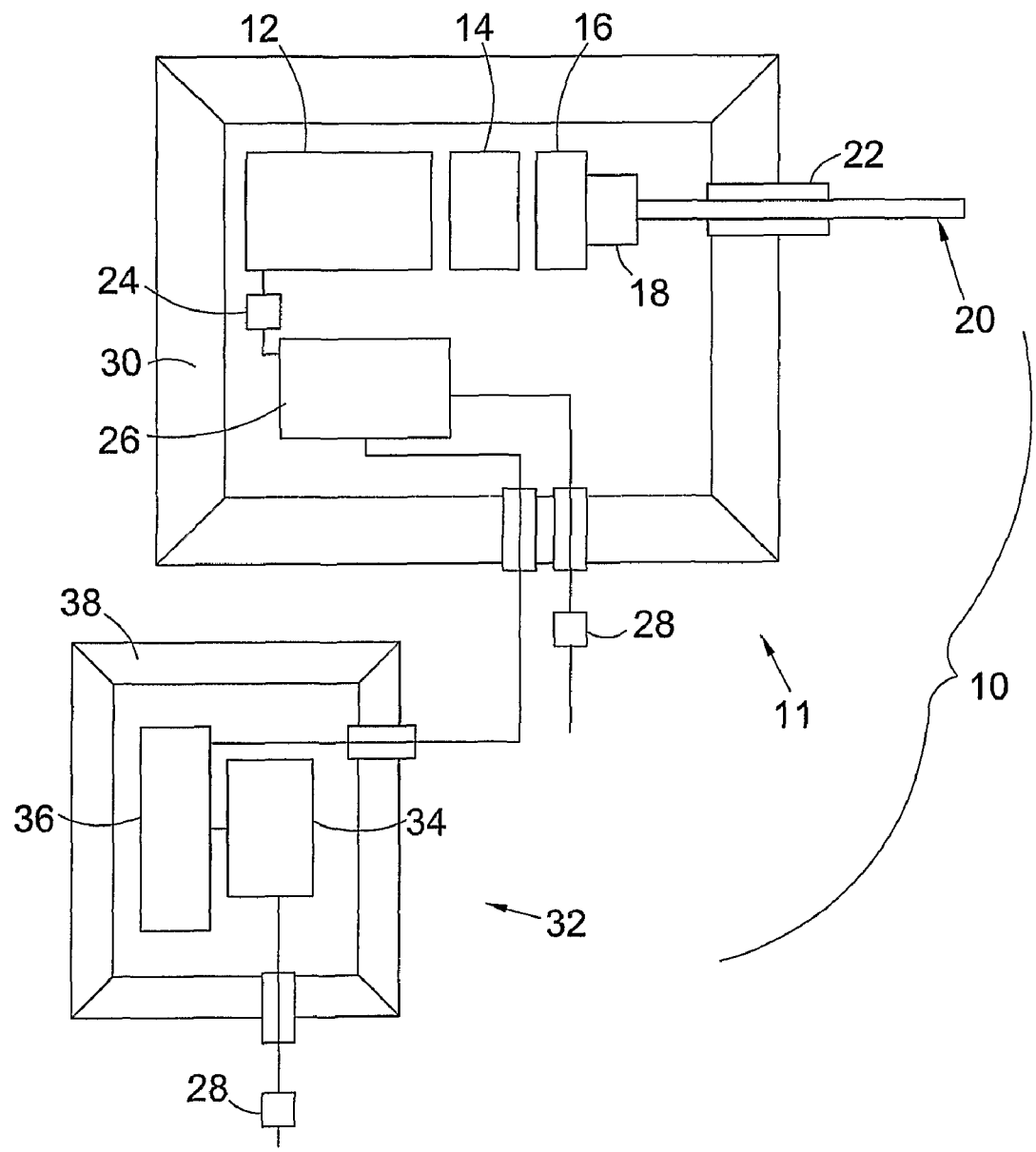
FIG. 1 shows an evacuation lighting system.

FIG. 1 shows a lighting system 10. The lighting system 10 has laser light assembly 11, a fiber light rope 20, and a battery back up (BBU) unit 32. The laser light assembly 11 has a DPSS laser 12 (output wavelength of 532 nm), which provides a beam of light. On the optical path of the beam are coupling optics 14, an index matching gel cell 18, and the fiber light rope 20. Further included in the laser light assembly 11 are a current protection module 24 and a laser management unit (LMU) 26. All the elements of the laser light assembly 11 are housed in an explosion and flameproof box 30.

The coupling optics 14 shape the beam and launch it into the fiber light rope 20 to ensure full fill therein and a substantially uniform power distribution so as to prevent the beam from concentrating on a small area of the fiber light rope 20 and producing areas of higher temperature. The coupling optics 14 may be, for example, telescope coupling optics, although any suitable optical arrangement may be used. The fiber light rope 20 is held in place by a fiber clamp 16. The fiber light rope 20 is constructed of 14 individual fibers held in a clear outer sheath. The fiber light rope 20 exits the explosion and flameproof box 30 by means of a flameproof gland 22.

The LMU 26 controls the electrical power supplied to the DPSS laser 12 for generating the light beam. Each laser has a characteristic drive current-output optical power relationship. Prior to installation, this current-power relationship is determined for each laser to determine a maximum drive current that will limit the optical power output by the laser to an upper safe optical power. This information is then stored in each DPSS laser 12. When a DPSS laser 12 is installed in the lighting system 10, the LMU 26 obtains the information regarding maximum drive current directly from the DPSS laser 12 and uses this to output the appropriate drive current to the DPSS laser 12 so that the DPSS laser 12 can output an optical power which is the same or less than the upper safe optical power. Thus, the LMU 26 sets the optical power of the DPSS laser 12 based on the current-power relationship, so that the temperature of the fiber light rope 20 does not exceed a predetermined upper safe temperature.

The predetermined upper safe temperature and the related upper safe optical power have been determined to be suitable for the most hazardous situation, i.e. in the event of a severed and particulate coated fiber end being exposed in a low auto ignition temperature (AIT) gas. In the present example, the upper safe temperature is 135 degrees centigrade.

The current protection module 24 is included between the LMU 26 and the laser 12. The current protection module 24 is a two fault tolerant zener barrier. The current protection module 24 acts as a clamp circuit, limits the drive current to the DPSS laser 12 and serves to limit the optical power of the beam emitted from the DPSS laser 12. The current protection module 24 is included to protect against any surges in the drive current output by the LMU 26. An appropriate zener barrier is selected for the current protection module 24 based on the determination of the above mentioned drive current-output optical power relationship and a unique current protection module 24 is prepared to be paired with its corresponding DPSS laser 12. Therefore, if the DPSS laser 12 needs to be replaced, then only the unique current protection module 24 will need to be replaced at the same time whereas the LMU 26 will not as the LMU 26 can simply continue operation based on information regarding the drive current-output optical power relationship of new DPSS laser 12.

In this system, the LMU 26 has two power sources at its disposal. The first is the mains or an external power supply and the second is an emergency battery back up (BBU) unit 32. The BBU unit 32 includes a custom step down and trickle charge circuit 34, and a battery pack 36. The BBU unit 32 is designed to have long service life and to give minimum power duration of 90 minutes to allow the lighting system 10 to provide sustained lighting even when mains power is lost. The BBU unit 32 is also housed in an explosion and flameproof box 38 and the BBU unit 32 is connected to the mains or an external power supply.

To prevent the fiber light rope 20 from overheating due to a transient power surge, a transient protection module 28 is fitted to the power input of the lighting system 10. This typically consists of a fuse and resistor combination.

In use, the DPSS laser 12 is activated and controlled by the LMU 26 to output a beam of laser light into the fiber light rope 20. Light is emitted from all sides of the fiber light rope 20 and as such the intensity of the laser beam within the fiber light rope 20 is highest closest to the laser light assembly 11. However, even though the brightness of the light is far higher at the start of the fiber light rope 20 than at points further along it, this brightness difference is not noticeable to the naked eye because the human eye responds in a logarithmic fashion to light. The upper safe optical power is determined in the most extreme case possible i.e. where a severed and particulate coated fiber end is exposed in a low auto ignition temperature (AIT) gas immediately next to the laser light assembly 11 where the intensity of the laser in the fiber light rope 20 is at its highest. The lighting system 10 of the invention is able to provide sufficient brightness to create a guide path light along a fiber light rope 20 of up to 150 meters in length from a single lighting system.

FIG. 2 shows four arrangements employing the evacuation lighting system of FIG. 1.

Figure 2A:
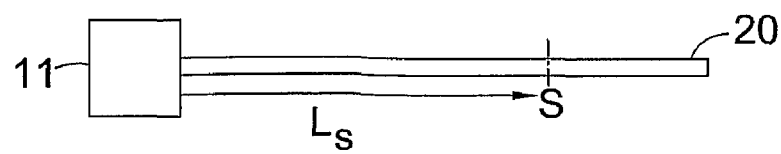
FIG. 2 shows four arrangements employing the evacuation lighting system of FIG. 1.

FIG. 2a shows a system in which the fiber light rope 20 has a laser light assembly 11 at one end thereof. If the fiber light rope 20 is undamaged or only partially fractured the lighting system 10 may provide emergency lighting along the entire length of the fiber light rope 20; if the fiber light rope 20 is severed the lighting system 10 may provide emergency lighting along a length of the fiber light rope 20 $L_s$ up to a severed part S of the fiber light rope 20.

Figure 2B:

FIG. 2b shows an arrangement in which a laser light assembly 11 is provided at each end of the fiber light rope 20. In this case, the lighting system 10 can safely provide emergency lighting along the entire length $L_D$ of the fiber light rope 20 in dangerous and hazardous environments even if the fiber light rope 20 is severed S at any point along its length as the portions of the fiber light 20 on either side of the severed point S can be illuminated by one or the other of the laser light assemblies 11. In the case where a laser light assembly 11 is provided at each end of the fiber light rope 20, as two beams of light will be coupled into the fiber light rope 20.

Figure 2C:
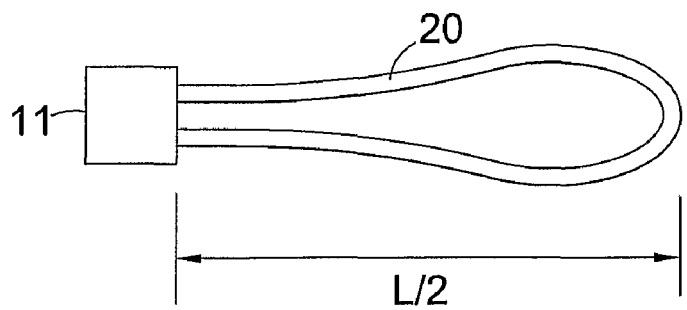

FIG. 2c shows an arrangement in which a single laser light assembly 11 is provided and the light beam is split using, for example, a beamsplitter (not shown), to double inject light into opposing ends of a single length of fiber light rope 20. In this case, the laser and the rope combine to form a closed optical loop. This arrangement ensures light can be provided at a safe level along the entire length of the fiber light rope irrespective of where the rope has been severed.

Figure 2D:
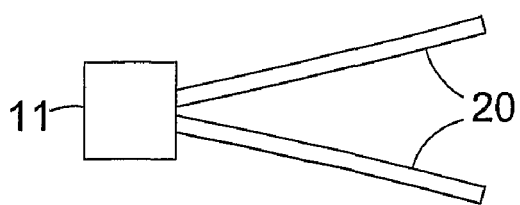

In FIG. 2d, the light beam is split using a beamsplitter to double inject into two separate lengths of fiber light rope 20. This arrangement provides more than one fiber light rope 20 per laser light assembly 11 and thus both flexibility in the location of the laser light assembly 11 (the fiber light ropes can go in opposite directions) or the ability to light both sides of a passageway.

A skilled person will appreciate that variations of the disclosed arrangements are possible without departing from the invention. Accordingly the above description of the specific embodiment is made by way of example only and not for the purposes of limitation. It will be clear to the skilled person that minor modifications may be made without significant changes to the operation described.

The invention claimed is:

1. A lighting system comprising a light source, a fiber rope into which light emitted from the light source is coupled, and a control unit for controlling the optical power of light emitted by the light source to maintain the fiber rope at or below a predetermined upper temperature even if the fiber is partially or fully severed.

2. A system as claimed in claim 1 wherein the light source is at least one of: a laser, a laser diode or an LED.

3. A system as claimed in claim 1 wherein the light coupled into the fiber is green or near-green.

4. A system as claimed in claim 1, wherein the light coupled into the fiber light rope substantially fills the fiber rope.

5. A system as claimed in claim 1, wherein the light coupled into the fiber light rope has a substantially uniform power or intensity distribution.

6. A system as claimed in claim 1 comprising means for shaping the light so that it substantially fills the fiber rope and/or has a substantially uniform power or intensity distribution.

7. A system as claimed in claim 1 comprising coupling optics to couple the light into the fiber light rope.

8. A system as claimed in claim 7 wherein the coupling optics perform the dual function of coupling the light into the fiber and shaping the light, so that it substantially fills the fiber rope and has a substantially uniform power distribution.

9. A system as claimed in claim 7, wherein the coupling optics are telescope coupling optics.

10. A system as claimed in claim 8, wherein the coupling optics include beam transformer optics to shape the light into a beam having a predetermined profile to promote spreading of the beam in the fiber light rope.

11. A system as claimed in claim 1 comprising an index matching gel cell to aid coupling of the light into the fiber light rope.

12. A system as claimed in claim 11 wherein the index matching gel cell is incorporated as part of an interface to the fiber light rope.

13. A system as claimed in claim 1, wherein the control unit supplies drive current to the light source to allow the light source to emit light at or below a predetermined upper optical power.

14. A system as claimed in claim 13 wherein the upper optical power is determined such that the temperature of the fiber light rope is maintained at or below a predetermined upper temperature.

15. A system as claimed in claim 1 wherein the upper temperature is in the range of 0-135 degrees centigrade.

16. A system claimed in claim 1 wherein an optical power-drive current relationship is determined for each light source prior to installation to determine an upper drive current corresponding to the upper optical power.

17. A system as claimed in claim 16 wherein information regarding the optical power-drive current relationship of a specific light source is made known to and used by the control unit to output an appropriate drive current to the light source so that an optical power which is the same or less than the upper optical power is emitted and the temperature of the fiber light rope is maintained at or below a predetermined upper temperature.

18. A system as claimed in claim 1 comprising a protection unit for limiting the drive current/power supplied to the light source.

19. A system as claimed in claim 18 wherein the protection unit is provided between the control unit and the light source.

20. A system as claimed in claim 1 comprising a power source and/or a backup power source.

21. A system as claimed in claim 20 wherein the control unit controls selection of the power source to be employed.

22. A system as claimed in claim 20 comprising a transient protection circuit module for the or each power source.

23. A system as claimed in claim 22, wherein the or each transient protection circuit module is between the control unit and its associated power source.

24. A system as claimed in claim 1, wherein a light source is coupled to each end of the fiber light rope, each light source having their own dedicated control units and power sources.

25. A system as claimed in claim 1 comprising an explosion and flameproof box in which the light source and control unit are contained.

26. A system as claimed in claim 1 comprising a beam-splitter in the optical path of light emitted by the optical source to split the light into two or more beams.

27. A system as claimed in claim 26 wherein the two or more beams are coupled into two or more fiber light ropes.

28. A system as claimed in claim 26 wherein the two or more beams are coupled into opposite ends of a single fiber light rope to form a closed loop.

29. A system as claimed in claim 1 wherein the fiber rope comprises a single solid fiber or a multi-core fiber or a bundle of single fibers.

30. A system as claimed in claim 29, wherein when the fiber rope comprises a plurality of side emitting fiber optic cables.

31. A system as claimed in claim 1 wherein an external transparent jacket surrounds the fiber rope.

32. A system as claimed in claim 1 comprising a power supply for powering the light source.

33. A system as claimed in claim 32, wherein the power supply comprises a battery.

34. A system as claimed in claim 1 wherein the fiber is made from one of the following materials: acrylic, PMMA, or silica.

* * * * *